United States Patent
Yuan et al.

(10) Patent No.: US 8,112,381 B2
(45) Date of Patent: Feb. 7, 2012

(54) MULTIVARIATE ANALYSIS OF WIRELESS SENSOR NETWORK DATA FOR MACHINE CONDITION MONITORING

(75) Inventors: Chao Yuan, Secaucus, NJ (US); Claus Neubauer, Monmouth Junction, NJ (US); Chellury R. Sastry, South Brunswick, NJ (US); Stefan Galler, Graz (AT)

(73) Assignee: Siemens Corporation, Iselin, NJ (US)

( * ) Notice: Subject to any disclaimer, the term of this patent is extended or adjusted under 35 U.S.C. 154(b) by 718 days.

(21) Appl. No.: 12/251,714

(22) Filed: Oct. 15, 2008

(65) Prior Publication Data

US 2009/0119243 A1 May 7, 2009

Related U.S. Application Data

(60) Provisional application No. 60/984,930, filed on Nov. 2, 2007.

(51) Int. Cl.
G06F 9/44 (2006.01)
G06N 7/02 (2006.01)
G06N 7/06 (2006.01)

(52) U.S. Cl. .................................. 706/52; 340/529
(58) Field of Classification Search .................... 706/52
See application file for complete search history.

(56) References Cited

U.S. PATENT DOCUMENTS

| 6,480,810 | B1 | 11/2002 | Cardella et al. | |
|---|---|---|---|---|
| 7,271,747 | B2 * | 9/2007 | Baraniuk et al. | 341/87 |
| 7,442,291 | B1 * | 10/2008 | Discenzo et al. | 210/85 |
| 7,511,643 | B2 * | 3/2009 | Baraniuk et al. | 341/87 |
| 7,705,725 | B2 * | 4/2010 | Matsen et al. | 340/529 |
| 7,864,039 | B2 * | 1/2011 | Georgeson | 340/529 |
| 2003/0097230 | A1 | 5/2003 | Garabedian | |
| 2003/0144746 | A1 * | 7/2003 | Hsiung et al. | 700/28 |
| 2005/0275532 | A1 | 12/2005 | Ferri et al. | |
| 2006/0182076 | A1 | 8/2006 | Wang | |
| 2007/0210929 | A1 | 9/2007 | Sabata et al. | |
| 2008/0255773 | A1 | 10/2008 | Yuan et al. | |

OTHER PUBLICATIONS

A Low-Cost and Accurate Indoor Localization Algorithm Using Label Propagation Based Semi-supervised Learning, Shaoshuai Liu; Haiyong Luo; Shihong Zou; Mobile Ad-hoc and Sensor Networks, 2009. MSN '09. 5th International Conference on Digital Object Identifier: 10.1109/MSN.2009.24 Publication Year: 2009 , pp. 108-111.*
International Search Report including Notification of Transmittal of the International Search Report, International Search Report, and Written Opinion of the International Searching Authority.
Yuan et al., "bayesian sensor estimation for machine condition monitoring", 2007 IEEE International Confernce on Acoustics, Speech and Signal Processing, Apr. 15-20, 2007, Honolulu, HI, pp. II-517.
Cataltepe et al., "A robust method to identify faults in correlated sensors in machine condition monitoring", European Signal Processing Conference 2005, Sep. 4, 2005, pp. 1-4.
Akyildiz et al., "Wireless sensor networks: a survey", Computer Networks, Elsevier Science Publishers B.V., Amsterdam, NL, vol. 38, No. 4, Mar. 15, 2002, pp. 393-422.
Yuan et al., "Support vector methods and use of hidden variables for power plant monitoring", 2005 IEEE International Conference on Acoustics, Speech and Signal Processing, IEEE, Piscataway, NJ, vol. 5, Mar. 18, 2005, pp. 693-696.
European Search Report dated Apr. 4, 2011.

* cited by examiner

Primary Examiner — Michael B Holmes

(57) ABSTRACT

Machine condition monitoring on a system utilizes a wireless sensor network to gather data from a large number of sensors. The data is processed using a multivariate statistical model to determine whether the system has deviated from a normal condition. The wireless sensor network permits the acquisition of a large number of distributed data points from plural system modalities, which, in turn, yields enhanced prediction accuracy and a reduction in false alarms.

20 Claims, 4 Drawing Sheets

MULTIVARIATE ANALYSIS OF WIRELESS SENSOR NETWORK DATA FOR MACHINE CONDITION MONITORING

CLAIM OF PRIORITY

This application claims priority to, and incorporates by reference herein in its entirety, pending U.S. Provisional Patent Application Ser. No. 60/984,930, filed Nov. 2, 2007, and entitled "Multivariate Analysis of Wireless Sensor Network Data for Machine Condition Monitoring."

FIELD OF THE INVENTION

The present invention relates generally to machine monitoring and maintenance. More specifically, the invention relates to improved techniques for early fault detection via condition-based maintenance (CBM) and predictive maintenance (PM).

BACKGROUND OF THE INVENTION

The catastrophic failure of machines in industries such as the power generation industry and manufacturing/process industries is an ongoing problem. Machines such as gas turbines, motors, pumps and compressors are susceptible to failures that may cause unexpected, extremely expensive plant or line shutdowns. To prevent such failures, industries have implemented preventive maintenance programs to insure that key components such as bearings, turbine blades and lubrication systems are inspected or replaced on a regular basis. Such scheduled maintenance programs, however, must balance the high cost of a maintenance event, often itself requiring shut-down, with the possibility that a component will fail prematurely, before it is replaced. The result is often the performance of unnecessary maintenance, whether needed or not, under the belief that performing the unnecessary maintenance is preferable to an increased risk of a component failure.

Remote machine monitoring and early fault detection have been used to more intelligently schedule machine maintenance. For example, condition-based maintenance (CBM) uses measured information about a machine to determine the health of the machine, and maintenance is performed only when actually necessary. Predictive maintenance (PM) systems perform maintenance at a point in time when the maintenance is most cost effective, but before the equipment performs less than optimally. Both systems reduce maintenance costs and decrease plant downtimes; thereby increasing operating revenue.

While CBM and PM systems do indeed reduce downtime, there is a need to improve the ability of such systems to accurately assess the condition of a given machine and reliably predict the need for maintenance. Any such improvement reduces the frequency of maintenance and thereby reduces maintenance costs.

SUMMARY OF THE INVENTION

The present invention addresses the needs described above by providing a method for performing maintenance on a system. The method includes the steps of measuring data using a plurality of wireless sensors in a wireless sensor network, the data representing a plurality of modalities of the system; transmitting the data via wireless radio signals from the wireless sensors to one or more base stations; comparing the data to a multivariate statistical model representing normal machine conditions, wherein relationships among sensor data representing plural modalities are considered; and performing maintenance on the system according to results of the comparing step.

The step of transmitting the data via wireless radio signals from the wireless sensors to one or more base stations may include utilizing ZIGBEE wireless protocol.

The step of transmitting the data via wireless radio signals from the wireless sensors to one or more base stations may include transmitting the data through a mesh network. At least one of the wireless sensors may also function as a router.

The method may further comprise the steps of processing the data in the base station using middleware implementing a service-oriented architecture (SOA); and transmitting the processed data to a remote location for performing the comparing step.

The method may further comprise the step of creating the multivariate statistical model by measuring training data during normal operation of the system using the plurality of wireless sensors in the wireless sensor network; transmitting the training data via the wireless radio signals from the wireless sensors to one or more base stations; and creating the multivariate statistical model representing normal machine conditions by representing a normal condition of the system as a region in a multidimensional sensor space. The comparing step may include determining whether the measured data falls within the normal region. The region representing a normal condition may be determined using a regression-based algorithm.

The plurality of wireless sensors in the wireless sensor network may include redundant wireless sensors measuring a same modality. The plurality of wireless sensors may include wireless sensors measuring a same modality at different locations, wherein the results of the comparing step includes a location of a fault in the system.

The step of transmitting the data via wireless radio signals from the wireless sensors to one or more base stations may further comprise the steps of creating a routing topology wherein wireless radio signals are routed from wireless sensors through other wireless sensors to the one or more base stations; identifying at least one wireless sensor having a degraded signal; and altering the routing topology to avoid routing wireless radio signals through the one identified wireless sensor.

Another embodiment of the invention is a computer-usable medium having computer readable instructions stored thereon for execution by a processor to perform the above method.

DESCRIPTION OF THE INVENTION

Several factors are of paramount importance in the design of robust condition-based maintenance (CBM) systems and predictive maintenance (PM) systems. First, vital operating parameters of machines such as temperature, pressure and vibration must be measured in real-time, and then reliably transported to a remote location. Machines are often scattered throughout a plant and hence there is need for distributed data acquisition. Second, sophisticated data analysis and interpretation algorithms must be undertaken at the remote location.

The inventors employ a wireless sensor network (WSN) for distributed data acquisition, and undertake the data analysis and interpretation through multivariate statistical techniques. The combination of those two elements, together with the particular implementations described below, yield unexpected advantages and improved results in machine monitoring.

Wireless sensor networks (WSNs) have been applied in a wide variety of remote monitoring and control applications. Those applications include environmental monitoring, human body monitoring, military surveillance, building automation, industrial monitoring and control, homeland security, and reconnaissance. A popular WSN communication standard that is gaining increased acceptance is the ZIGBEE wireless control technology. ZIGBEE is a suite of high level communication protocols using small, low-power digital radios based on the IEEE 802.15.4-2006 standard. The ZIGBEE Alliance, the standards body that defines ZIGBEE, publishes application profiles for creating interoperable products incorporating ZIGBEE technology.

Figure 1:
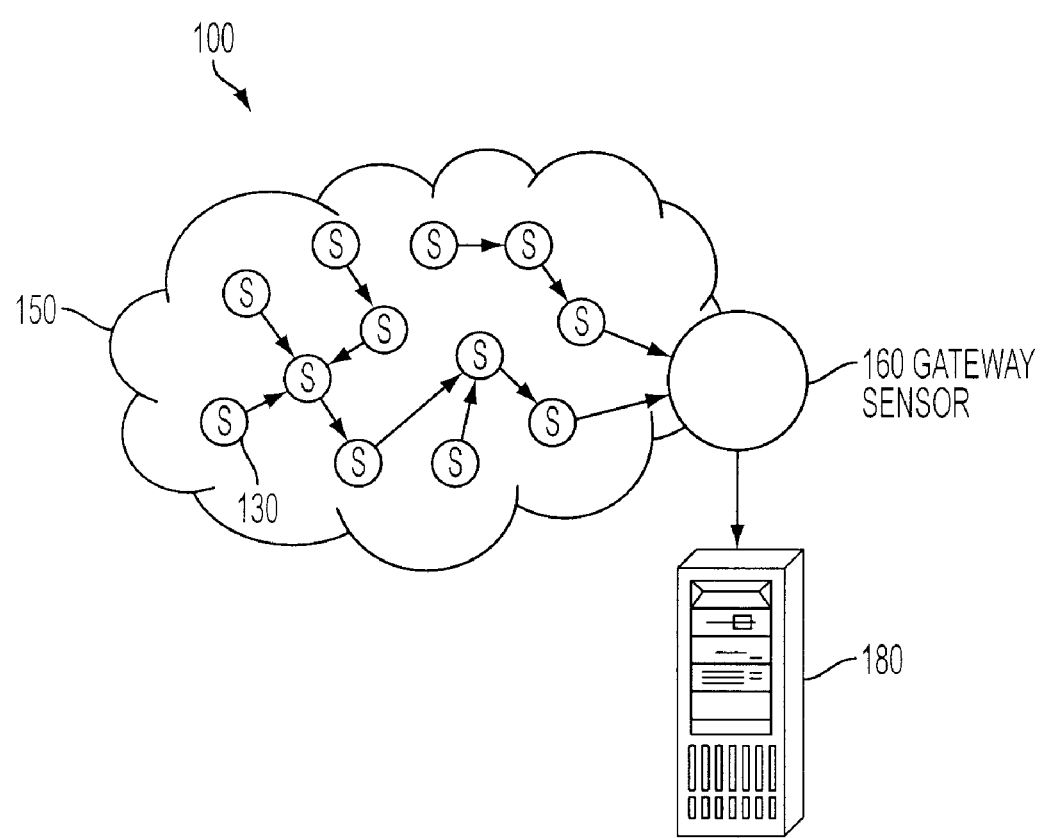
FIG. 1 is a schematic diagram showing a machine monitoring system in accordance with the present invention.

In a remote WSN monitoring application, such as the application 100 shown in FIG. 1, cost-effective, autonomous low-data rate, low-power, micro sensing nodes 130 are spatially distributed in an ad hoc manner over an area of interest and form what is referred to as a mesh network 150. The sensing nodes 130 in the WSN monitoring application cooperatively monitor physical or environmental conditions, such as temperature, sound, vibration, pressure, motion or pollutants, at different locations.

In addition to one or more sensors, each sensing nodes 130 in a WSN includes a radio transceiver or other wireless communications device, a small microcontroller, and an energy source, usually a battery. Size and cost constraints on sensor nodes may result in corresponding constraints on resources such as energy, memory, computational speed and bandwidth. In general, however, the sensor nodes may be relatively low-cost and configured for simple installation.

The sensor network 150 normally constitutes a wireless ad-hoc network, meaning that each sensor supports a multi-hop routing algorithm in which several nodes may forward data packets to a gateway sensor 160. Individual sensor nodes 130 sense information as measurements and communicate the sensed information via radio transmission to other sensor nodes that act as routers, and eventually to a gateway sensor 160, also referred to as base station or sink or middleware platform. After an optional preprocessing step, the gateway sensor 160 forwards the measurements to a processor 180 running the CBM/PM algorithms of the invention at a remote location.

The WSN deployment of the present invention utilizes a novel, high-performance middleware running in the gateway sensor node 160. That middleware is designed and implemented based on a service-oriented architecture (SOA). The CBM/PM algorithms running at the remote location consume sensor data through that SOA-based middleware.

Figure 2:
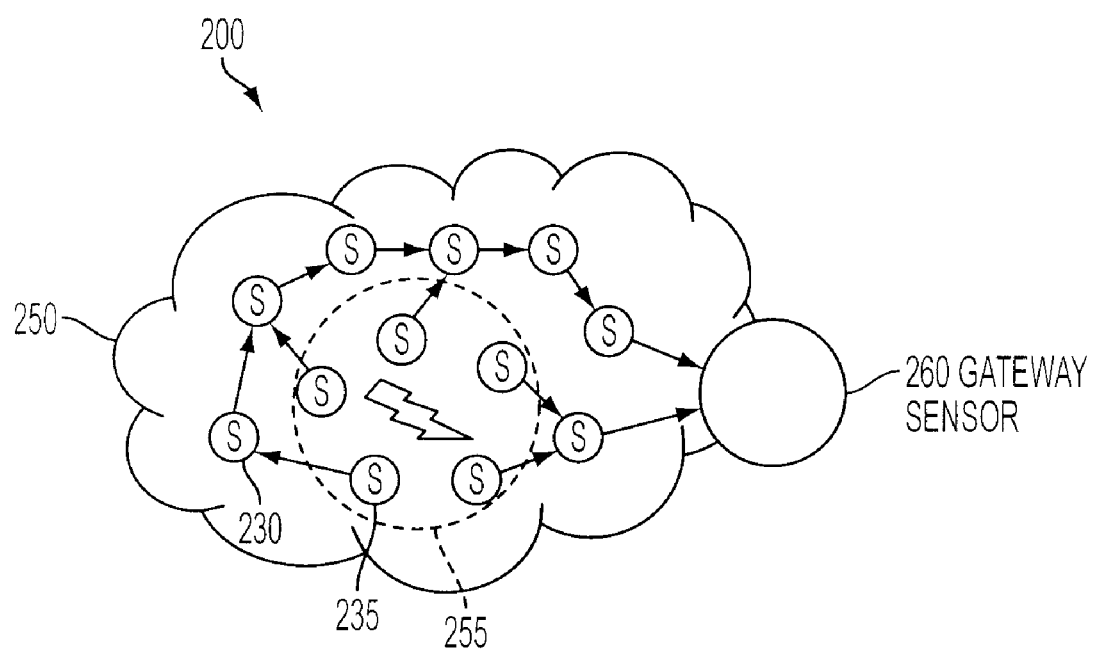
FIG. 2 is a schematic diagram showing another machine monitoring system in accordance with the present invention.

The middleware may optimize the WSN deployment topology for performance in an adverse industrial environment 200, as shown in FIG. 2. For example, some of the deployed wireless sensors in the WSN 250, such as sensor 235, may be in a zone 255 subjected to a large amount of electromagnetic interference, as is typical in an industrial environment. Other wireless sensors, such as sensor 230, are subjected to a lower level of interference, perhaps being more distant from the source of the electromagnetic radiation. The level of electromagnetic interference at a particular sensor may be determined by the middleware by measuring a degradation of the signal from the sensor.

The middleware of the invention, running in the gateway sensor 260, may minimize the impact of that electromagnetic interference by changing the routing topology to route sensor signals only through sensors such as sensor 230 that are subjected to a lower level of interference, and assigning the sensors subjected to higher levels of interference, such as sensor 235, only as end points in the mesh topology. Because the sensors have wireless routing capability, they may be easily reconfigured by the middleware as signals in the system degrade or improve.

The utilization of wireless sensor nodes for tasks such as CBM and PM has numerous benefits. First, the cost and effort involved in wiring sensors is eliminated. Wiring costs for sensor installations on existing industrial machinery can range from $10 to $1000 per foot. Wired sensor installation furthermore consumes scarce resources such as skilled repair and maintenance personnel, and requires machine downtime. Those factors further increase installation costs.

Wireless sensors can be placed at a multitude of locations, including those locations where wiring is extremely expensive, impossible or even hazardous. As compared to wired sensors, wireless sensors can easily be re-located with minimal disruption. WSN systems typically recognize added sensors automatically, without the need for additional I/O programming or setup.

Each of those factors facilitates the utilization of a large number of wireless sensors in the system of the present invention. That large number of sensors provides a large, rich, and diverse data set of measurements from the subject machines, enhancing the performance and robustness of the CBM/PM algorithms.

Once the sensor data has been acquired through the mesh network of wireless sensors and has been preprocessed by the SOA-based middleware, the sensor data is analyzed and interpreted to identify machine faults using the multivariate statistical technique of the invention. The multivariate technique improves over univariate approaches that were previously used. In a univariate system, each sensor signal is analyzed independently from other sensor signals. For example, an alarm is produced if a particular temperature exceeds a permissible range. Such decisions were made regardless of the readings of other sensors (e.g., pressure). The multivariate method of the present invention instead explores the relationship among multiple sensors, which may come from different modalities. Correlation between those sensors is used to predict failures. That technique has been demonstrated to perform better than the univariate approaches.

Figure 4:
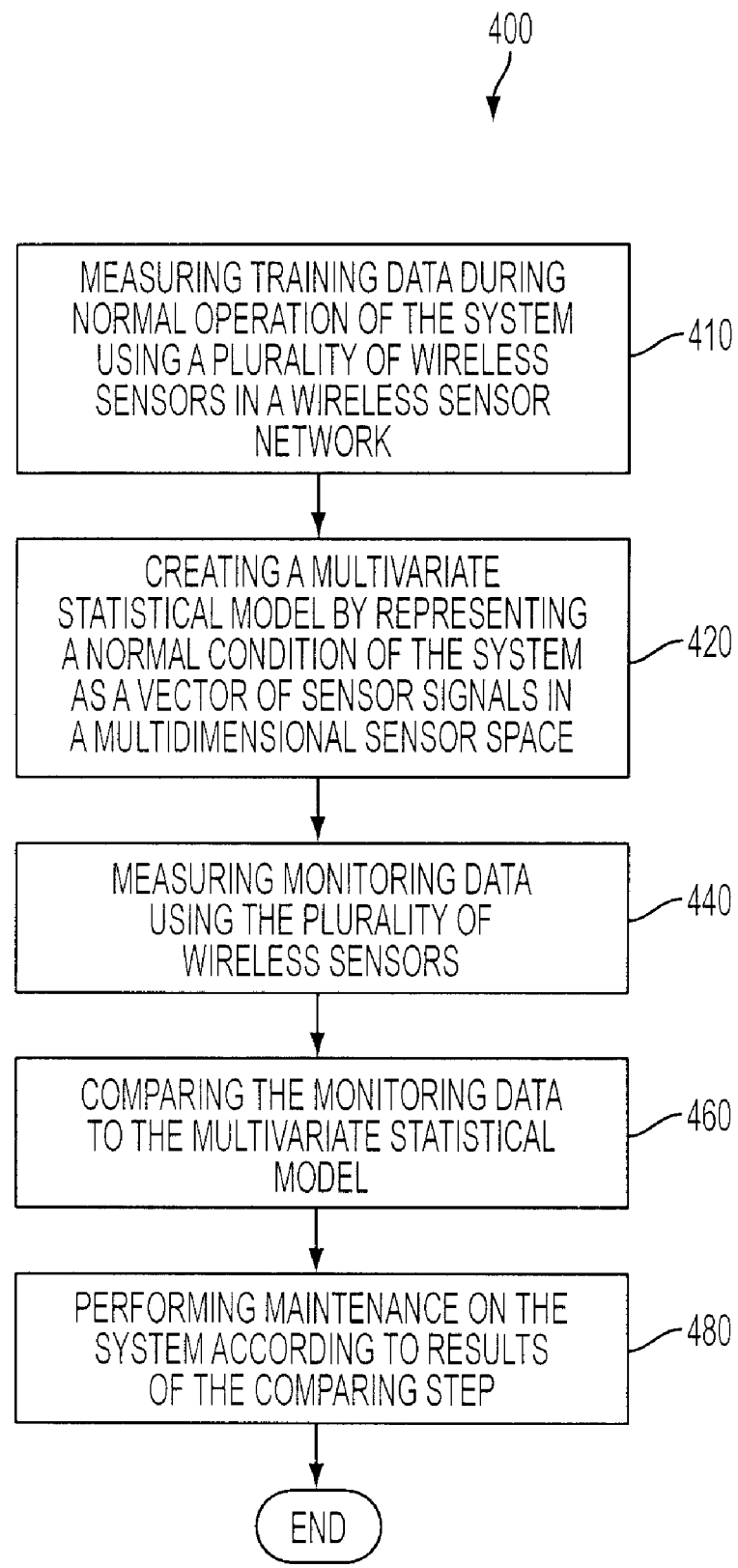
FIG. 4 is a flow diagram showing a method in accordance with the present invention.

The first task in the multivariate approach of the invention, as shown in FIG. 4, is to establish a statistical model representing the normal machine condition. That is accomplished by training (step 410) with historical data samples taken in different parts of the machine during normal operation. Using statistical modeling, the operating state of a machine is typically represented (step 420) as a normal operating region in a multidimensional space of sensor signals. The region includes data collected during normal operation from the set of available sensors.

Figure 3:
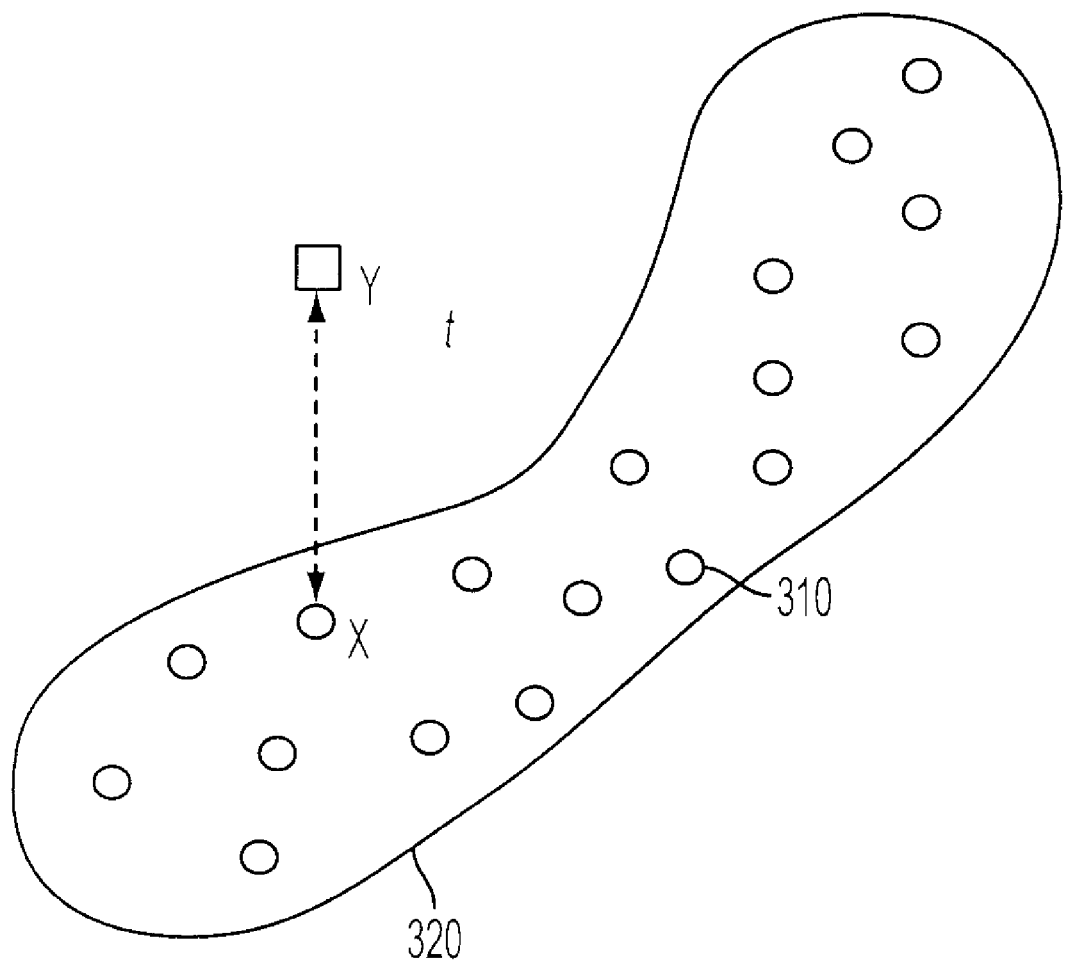
FIG. 3 is a schematic plot representing a machine monitoring algorithm in accordance with the present invention.

The task of training in a machine monitoring system is to learn the distribution of the sensor vector when the machine is working normally. A representation 300 of a simplified two-dimensional (two-sensor) system is illustrated in FIG. 3. Each of the round points 310 represents a measured normal operating training sensor vector including readings from the two sensors represented by the two dimensions. The sensor vector training data is distributed in a normal operating region 320.

An observation Y, shown as a square point, represents a fault because it is outside the normal operating region 320. The point X is the corresponding estimate in the normal operating range. When the machine is operating normally, the machine monitoring sensor vector is in the normal operating range of the sensor space. In a real system that space is a high-dimensional space representing many sensors. If the sensor vector is out of that region, a fault is likely to occur.

Returning to FIG. 4, after the statistical model is created from the training data, the machine is monitored by gathering data (step 440) through the wireless sensor network and transmitting the data via wireless radio signals from the wireless sensors to the base stations. After preprocessing by the SOA-based middleware, the data is transmitted to a remote location where it is compared (step 460) to the multivariate statistical model, which represents normal machine conditions. In that way, relationships among sensor data representing plural modalities are considered. Faults or abnormalities are detected as outliers from the normal distribution. Based on the results of that comparison, maintenance is performed (step 480) on the system.

In a preferred embodiment of the invention, a Gaussian mixture model is employed to model the normal operating range of the machine. A Gaussian random vector is introduced to model the possible deviations of the observed sensor values from their corresponding normal values. Different levels of deviations are handled by the covariance matrix of this random vector, which is estimated adaptively for each input observation. The algorithm does not require faulty operation training data, as required by previous methods. Significant improvements over the previous methods are achieved. That Gaussian mixture model is described in more detail in Yuan Chao et al., U.S. Patent Publication No. 2008/0086283, published Apr. 10, 2008, assigned to the same assignee as the present application, and the disclosure of which publication is incorporated by reference in its entirety herein.

A limiting factor in applying multivariate analysis techniques to machine condition monitoring is the number of sensors available on a machine of interest. It is desirable to have sensor readings from as many modalities as possible and from as many locations as possible so that the condition of a machine can be adequately represented by those readings. Sensor readings from an increased number of modalities and locations enhances prediction accuracy and reduces false alarms.

In many real-world cases, some important sensors are not installed. For example, air humidity is a critical process driver for a gas turbine, but measurements of that physical characteristic are not available in many turbines. With only partial input information, a regression-based multivariate model is not accurate.

Even if sensors are installed on a machine to measure many different physical characteristics, it is often additionally beneficial to have redundant sensors measuring the same characteristic. That is due to several factors. First, sensor failures (in contrast to machine failures) happen with some frequency. In the event of a sensor failure, reliable readings are needed from backup sensors. Second, sensor measurements are better predicted if measurements from similar sensors measuring the same quantity are available.

Modern fault diagnosis not only requires successful detection of a failure, but also demands accurate localization of a failure. That is of special interest for monitoring a very large machine such as a gas turbine or an airplane, for which inspection of the whole machine is often very costly. For that reason, it is preferable to have sensors installed in different parts of the machine such that when a failure is detected by some sensors, information on the location of the problem is available. For example, pressure measurements at a plurality of radial locations in a turbine stage can provide information not only on the existence of a fault, but on a radial location of the fault. That additional knowledge enables maintenance personnel to perform inspection only on relevant small pieces.

Thus, to meet the increasing needs for more accurate and more reliable machine condition monitoring systems, it is desirable to install extra sensors on both existing and new machines. That can be achieved in a cost-effective manner through this the use of a WSN for distributed data acquisition.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the technique is described primarily for use in connection with machine condition monitoring, those skilled in the art will understand that the technique may be used as well in connection with other monitoring applications such as security and vehicular traffic control. It is to be understood that the embodiments shown and described herein are only illustrative of the principles of the present invention and that various modifications may be implemented by those skilled in the art without departing from the scope and spirit of the invention.

What is claimed is:

1. A method for performing maintenance on a system, the method comprising:

measuring data using a plurality of wireless sensors in a wireless sensor network, the data representing a plurality of modalities of the system;

transmitting the data via wireless radio signals from the wireless sensors to one or more base stations;

comparing the data to a multivariate statistical model representing normal machine conditions, wherein relationships among sensor data representing plural modalities are considered; and performing maintenance on the system according to results of the comparing;

wherein transmitting the data via wireless radio signals from the wireless sensors to one or more base stations further comprises:

creating a routing topology wherein wireless radio signals are routed from wireless sensors through other wireless sensors to the one or more base stations;

identifying at least one wireless sensor having a degraded signal; and altering the routing topology to avoid routing wireless radio signals through the one identified wireless sensor.

2. The method of claim 1, wherein the step of transmitting the data via wireless radio signals from the wireless sensors to one or more base stations includes:

utilizing ZIGBEE wireless protocol.

3. The method of claim 1, wherein transmitting the data via wireless radio signals from the wireless sensors to one or more base stations includes:

transmitting the data through a mesh network.

4. The method of claim 3, wherein at least one of the wireless sensors also functions as a router.

5. The method of claim 1, further comprising:
processing the data in the base station using middleware implementing a service-oriented architecture (SOA); and
transmitting the processed data to a remote location for performing the comparing step.

6. The method of claim 1, further comprising creating the multivariate statistical model by:
measuring training data during normal operation of the system using the plurality of wireless sensors in the wireless sensor network;
transmitting the training data via the wireless radio signals from the wireless sensors to one or more base stations; and
creating the multivariate statistical model representing normal machine conditions by representing a normal condition of the system as a region in a multidimensional sensor space.

7. The method of claim 6,:
wherein the comparing comprises determining whether the measured data falls within the normal region.

8. The method of claim 6, wherein the region representing a normal condition is determined using a regression-based algorithm.

9. The method of claim 1, wherein the plurality of wireless sensors in the wireless sensor network includes redundant wireless sensors measuring a same modality.

10. The method of claim 1, wherein the plurality of wireless sensors in the wireless sensor network includes wireless sensors measuring a same modality at different locations, and wherein the results of the comparing include a location of a fault in the system.

11. A computer-usable medium having computer readable instructions stored thereon for execution by a processor to perform a method for performing maintenance on a system, the method comprising:
measuring data using a plurality of wireless sensors in a wireless sensor network, the data representing a plurality of modalities of the system;
transmitting the data via wireless radio signals from the wireless sensors to one or more base stations;
comparing the data to a multivariate statistical model representing normal machine conditions, wherein relationships among sensor data representing plural modalities are considered; and
performing maintenance on the system according to results of the comparing;
wherein transmitting the data via wireless radio signals from the wireless sensors to one or more base stations further comprises:
creating a routing topology wherein wireless radio signals are routed from wireless sensors through other wireless sensors to the one or more base stations;
identifying at least one wireless sensor having a degraded signal; and
altering the routing topology to avoid routing wireless radio signals through the one identified wireless sensor.

12. The computer-usable medium of claim 11, wherein transmitting the data via wireless radio signals from the wireless sensors to one or more base stations includes:
utilizing ZIGBEE wireless protocol.

13. The computer-usable medium of claim 11, wherein transmitting the data via wireless radio signals from the wireless sensors to one or more base stations includes:
transmitting the data through a mesh network.

14. The computer-usable medium of claim 13, wherein at least one of the wireless sensors also functions as a router.

15. The computer-usable medium of claim 11, wherein the method further comprises:
processing the data in the base station using middleware implementing a service-oriented architecture (SOA); and
transmitting the processed data to a remote location for performing the comparing.

16. The computer-usable medium of claim 11, wherein the method further comprises creating the multivariate statistical model by:
measuring training data during normal operation of the system using the plurality of wireless sensors in the wireless sensor network;
transmitting the training data via the wireless radio signals from the wireless sensors to one or more base stations; and
representing a normal condition of the system as a region in a multidimensional sensor space.

17. The computer-usable medium of claim 16, wherein the method further comprises:
wherein the comparing comprises determining whether the measured data falls within the normal region.

18. The computer-usable medium of claim 16, wherein the region representing a normal condition is determined using a regression-based algorithm.

19. The computer-usable medium of claim 11, wherein the plurality of wireless sensors in the wireless sensor network includes redundant wireless sensors measuring a same modality.

20. The computer-usable medium of claim 11, wherein the plurality of wireless sensors in the wireless sensor network includes wireless sensors measuring a same modality at different locations, and wherein the results of the comparing include a location of a fault in the system.

* * * * *